(No Model.) 5 Sheets—Sheet 1.
H. F. W. LIEBMANN.
FILE CUTTING MACHINE.
No. 323,874. Patented Aug. 4, 1885.
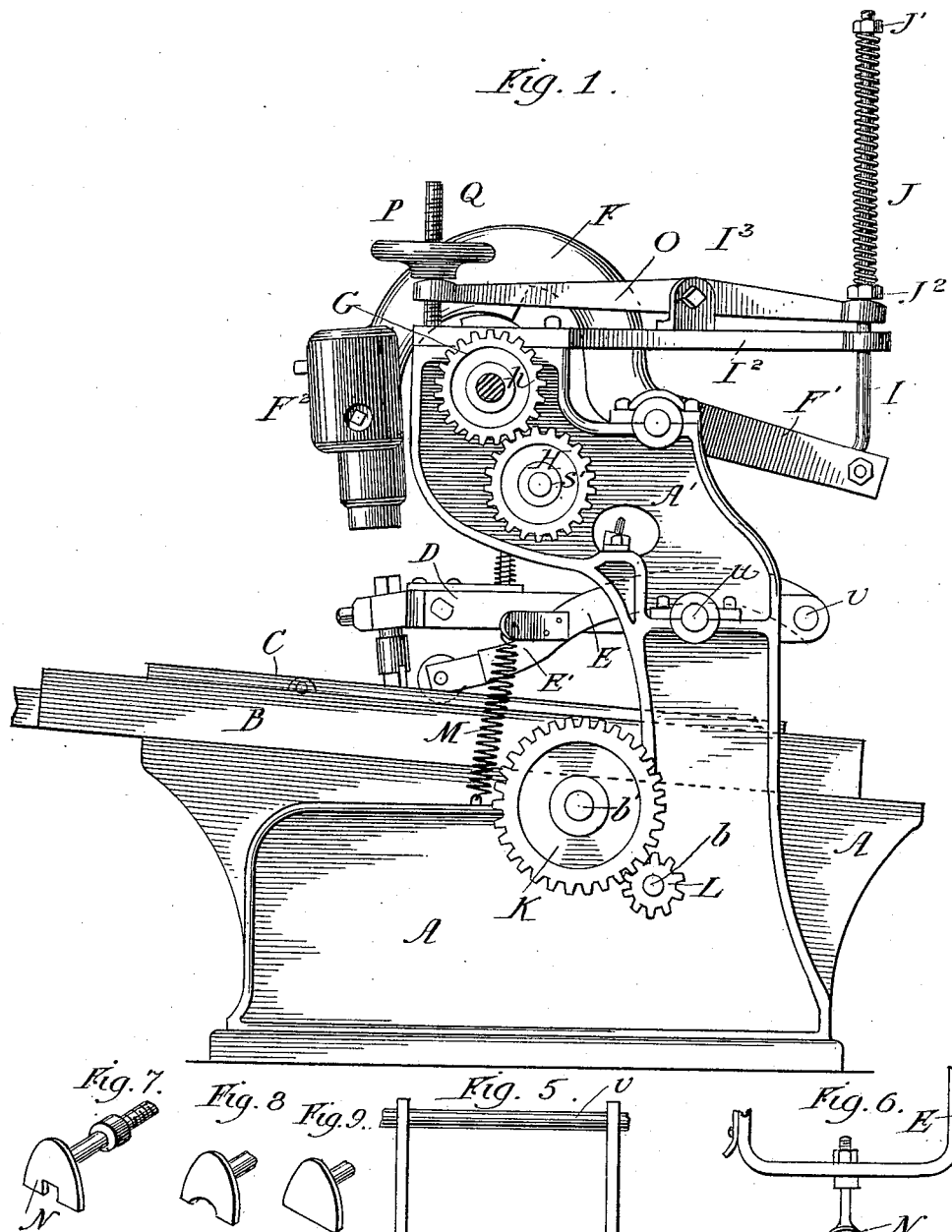

(No Model.)  H. F. W. LIEBMANN.  5 Sheets—Sheet 2.
FILE CUTTING MACHINE.
No. 323,874.  Patented Aug. 4, 1885.
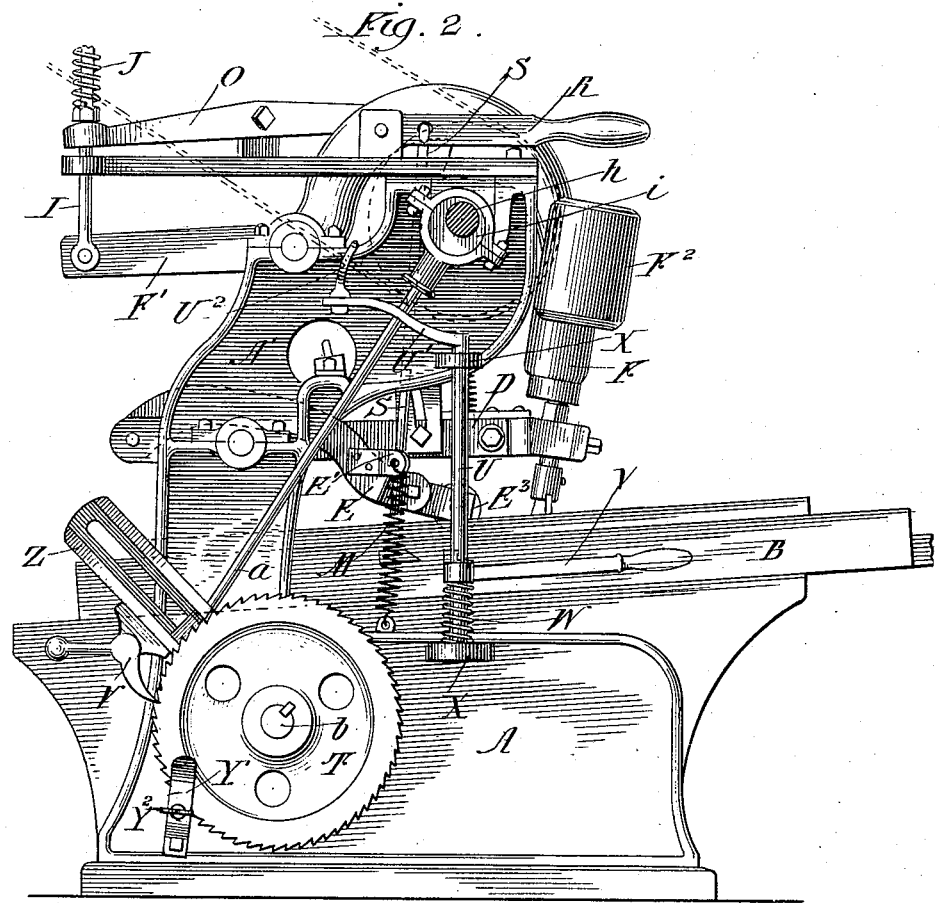
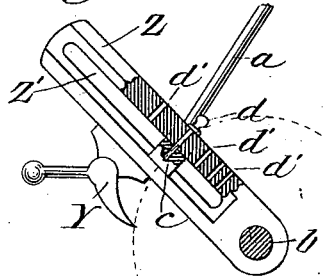
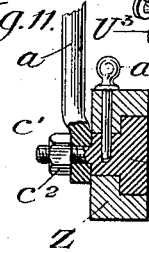
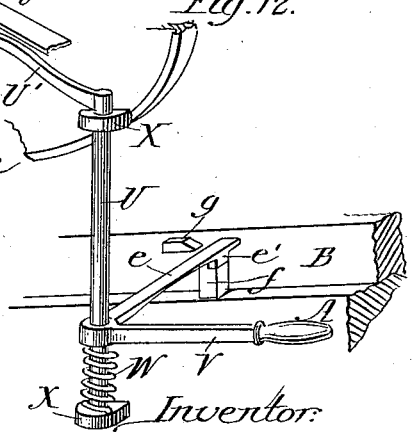

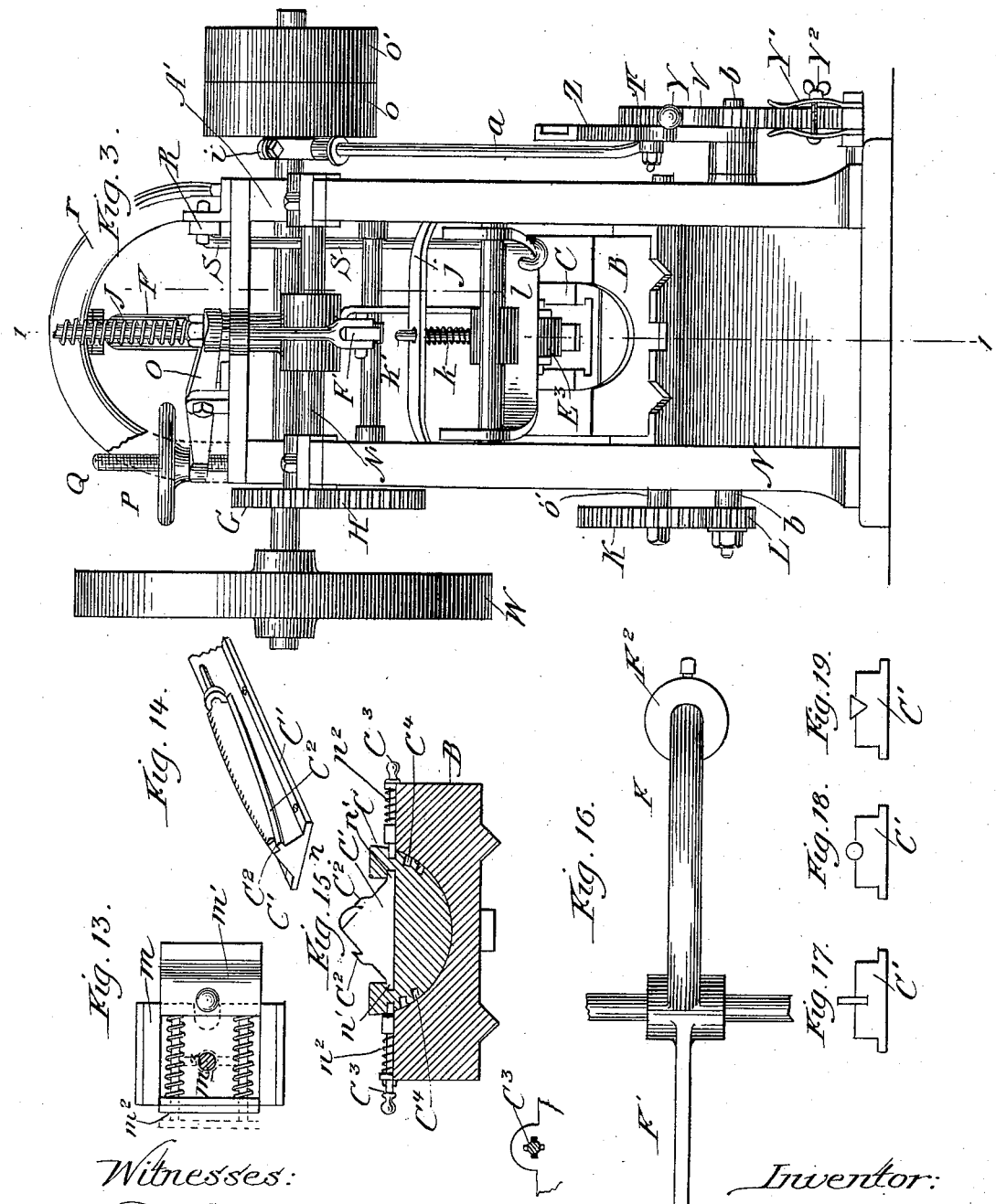

(No Model.) 5 Sheets—Sheet 4.
H. F. W. LIEBMANN.
FILE CUTTING MACHINE.
No. 323,874. Patented Aug. 4, 1885.
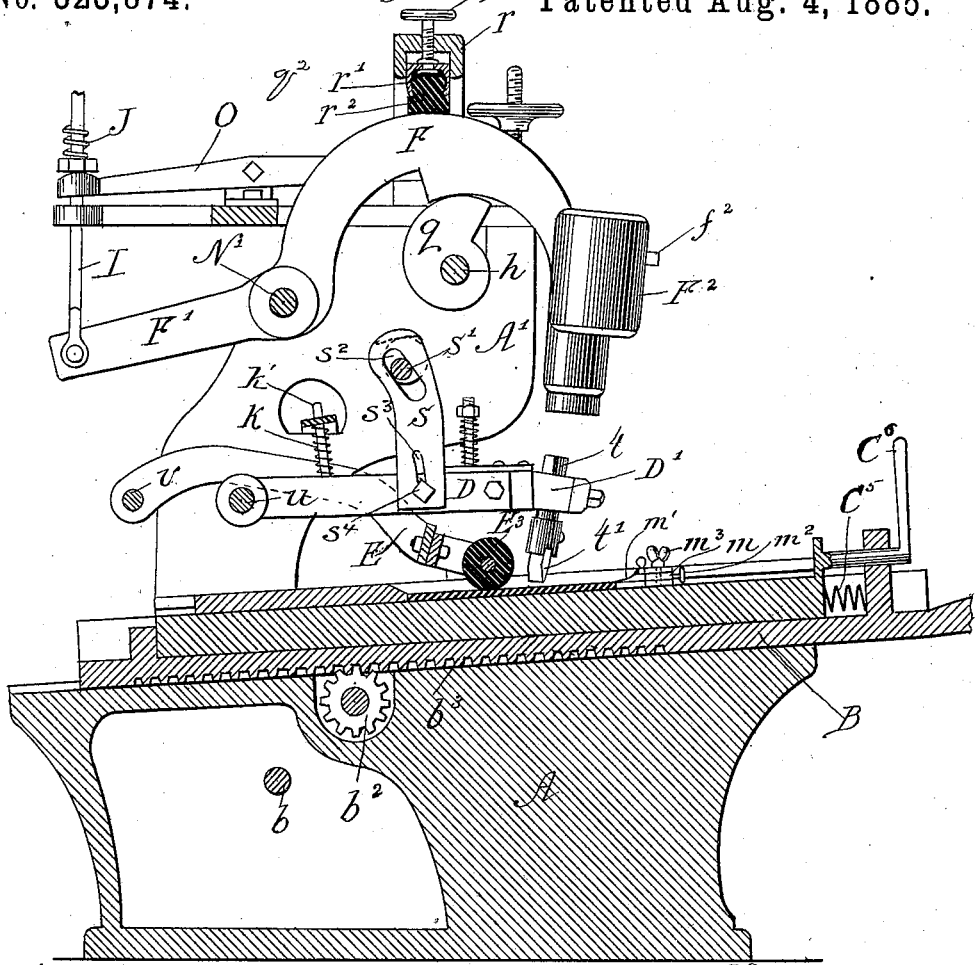
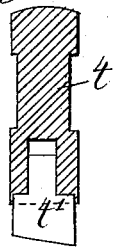
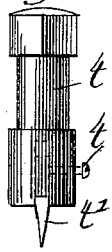
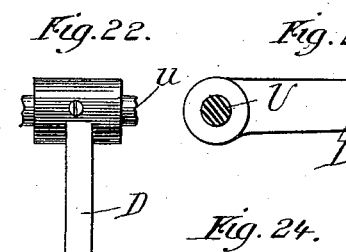
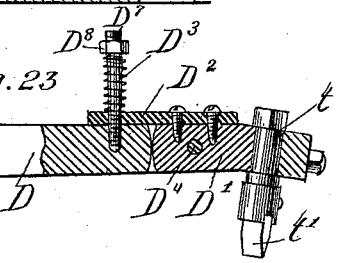
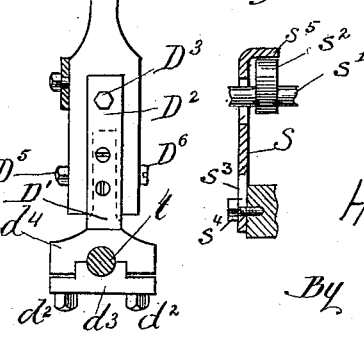
Witnesses:
Frank J. Blanchard
Louis Nolting
Inventor:
H F W Liebmann
By A. M. Stout
Attorney.

(No Model.)
H. F. W. LIEBMANN.
FILE CUTTING MACHINE.
No. 323,874.                    Patented Aug. 4, 1885.
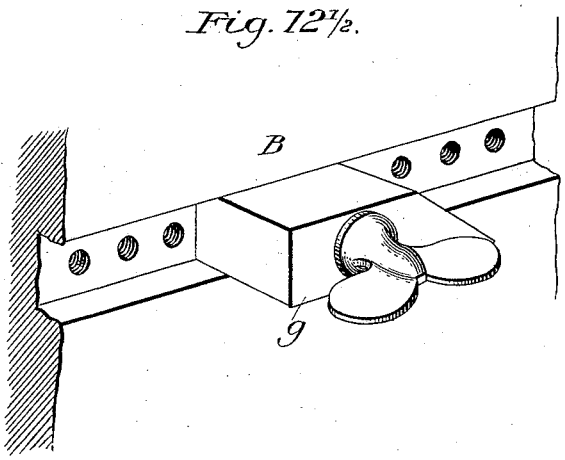
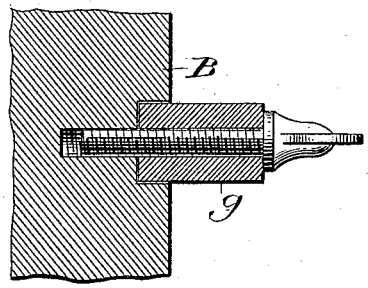

UNITED STATES PATENT OFFICE.

HERMANN F. W. LIEBMANN, OF CHICAGO, ILLINOIS, ASSIGNOR OF ONE-HALF TO HENRY K. MEYER, OF SAME PLACE.

FILE-CUTTING MACHINE.

SPECIFICATION forming part of Letters Patent No. 323,874, dated August 4, 1885.

Application filed December 22, 1884. (No model.)

*To all whom it may concern:*

Be it known that I, HERMANN F. W. LIEBMANN, of Chicago, county of Cook, and State of Illinois, have invented Improvements in File-Cutting Machines, of which the following is a specification.

My invention relates to improvements in machines for cutting files, and will be hereinafter fully described with reference to the accompanying drawings, in which—

Figure 1 represents an elevation of the right-hand side of a machine embracing my improvements; Fig. 2, a like view of the left-hand side of the same; Fig. 3, a like view of the rear side of the same; Fig. 4, a longitudinal vertical section thereof, taken as indicated by the broken line 1 1 in Fig. 3; Figs. 5, 6, 7, 8, 9, 10, 11, 12, 12½, 13, 14, 15, 16, 17, 18, 19, 20, 21, 22, 23, and 24, detail views of different parts of the same.

In the drawings, A and A' indicate the frame; $h$, the main driving-shaft, journaled in the frame; $o$ and $o'$, fast and loose band-pulleys on the same shaft; G, a gear-wheel, and W' a balance-wheel on the same; $s'$, a shaft, on which gear-wheel H and cam $s^2$ are mounted, and it receives motion from the main shaft $h$ through gear-wheel H, mounted upon it; N', another shaft, having its bearings in the frame, and upon it the hammer-lever F and F' is pivoted, and the forward and arched end of the lever is provided with the notch and shoulder $q^2$, to correspond with the point or set-off of the cam $q$, fixed on shaft $h$, so that when that shaft is revolved to the right the point of the cam will fall into that notch and the hammer-head will strike a downward blow.

$F^2$ is a weight that fits over the hammer-head, and is attached thereto by means of screw $f^2$, passing through it into the head. The weight is designed to give greater force to the blow struck by the hammer-head.

$r$ indicates an arch extending over and across the machine. It is hollow, and the hollow in it serves as a chamber for the spring-case $r'$ for the rubber spring $r^2$, which is compressed when the hammer is raised by the cam $q$; but it expands when the hammer is released and adds force to its blow.

I is a rod pivoted to the rear end, F', of the hammer-lever, and extends up through an eye-hole in bar $I^2$, which is fastened upon the frame, and that bar is provided with a standard, $I^3$, to which is pivoted, by headed bolt and nut, the lever O. Through an eye-hole in one end of that lever the rod I extends, and through another eye-hole in the other end is inserted the screw-shaft Q, upon which works the nut P, having the form of a hand-wheel. On the rod I is placed the spiral spring J, which is seated below on a loose ring, $J^2$, resting on the end of the lever O, and the upper end of rod I is screw-threaded and provided with nut J', by the turning of which up and down upon the rod the spring is compressed or allowed to expand. Now, the object of this combination of devices is to still further increase the force of the blows of the hammer, for by turning down the nut P upon the end of lever O the opposite end is made to compress the spring J and afford it stiffness, and that spring can also be compressed by turning down the nut J', and when the hammer is raised by means of the cam $q$ it is raised against the tension of the spring, and when the hammer is freed from the point of the cam $q$ the rebound of the spring adds its force to that of the rubber spring $r^2$ and to that of the weight of the hammer-head. The rubber spring $r^2$ may be stiffened by turning in the screw $r^3$. Thus are provided three different means of increasing the force of the blows struck by the hammer—namely, by turning the screw $r^3$, the nut J', and by putting on and off the weight $F^2$. The blows of the hammer, the force of which is thus regulated, are delivered upon the head of a chisel-holder, $t$, several views of which, as well as of the chisel-arm D, are shown in Figs. 20, 21, 22, and 23. The chisel-arm works upon shaft $u$, journaled in the frame, and consists of two parts, D and D', the adjacent portions of which are adapted to roll upon each other, and the two parts are connected together by means of the metal plate $D^2$, the outer end of which is fastened down upon part D' by means of the two screws, as shown, and by the screw $D^6$ and its nut $D^5$, while the other end is held down upon part D by the force of the spiral spring $D^3$, seated upon screw $D^7$, the spring being regulated by the nut $D^8$. The outer end, D', of the chisel-arm has independent vertical motion upon the headed pin $D^6$, which is held in place by nut $D^5$. The chisel-holder is provided with a neck, as shown, which is inclosed by the two parts $d^3$ and $d^4$, which are held together by screws $d^2$, as shown in Fig. 22, after the holder shall have been adjusted to any angle required with the line of motion of the file-blank. The lower end of the holder is provided with a suitable recess for the upper end of the chisel or cutter $t$, which is confined therein by the screw $t^2$.

The before-specified spring-joint between the parts D and D' of the arm afford freedom of action to the cutter, and also enables it to make its cuts at an inclination to the face of the file-blank as required.

In order that the chisel-arm may be lifted at the proper time after each cut is made, the shaft $s'$, having its bearings in the frame, is provided with cam $s^2$ and with gear-wheel H, which meshes with its equal gear-wheel G, so that shaft $s'$ has imparted to it the same motion with shaft $h$, and then the chisel-arm is connected with shaft $s'$ by means of the peculiarly-formed link $s$, which is provided with a slot, $s^3$, in its lower end, by means of which and the headed screw $s^4$ is passed through and turned into the chisel-arm, and thus fastened thereto at any vertical adjustment required, and the link $s$ is also provided with a diagonal slot near its upper end, through which the shaft $s'$ is passed, and the upper end of the link is turned over to form a right angle with its body, so as to form a flange, $s^5$, which extends over the cam $s^2$, the result of which construction and arrangement is, that when shaft $s'$ is revolved the cam, acting upon the flange of the link, causes the chisel-arm to reciprocate vertically in correspondence with the motion of the hammer.

In order to hold the chisel-arm with a certain amount of yielding pressure, the pin K' is fixed into the top side of the arm, and provided with the spiral spring $k$, which is held down at its upper end by the cross-bar $j$, fastened on the frame; and in order to confine and press down with a like pressure the file-blank upon its bed while being cut, I have devised a frame, E. (Shown in Fig. 5.) It consists of a journal-bar, $v$, having its bearing in the main frame, and two side pieces provided with ears E', to which are attached spiral springs M, the lower ends of which are attached to the frame, as shown. The frame works upon the journal-bar $v$, while the springs hold the opposite end down with the requisite force, and to the lower end of the frame are suitably attached any of the devices shown in Figs. 7, 8, and 9, or a smaller frame with a simple roller, as shown, and Fig. 6 shows the manner of such attachment.

The device shown in Fig. 7 is designed to fit over the edge of a flat file-blank and hold it during the operation of cutting, and the one shown in Fig. 8 for the face or edge of a blank of rounded form. This frame E and the devices to be connected therewith hold the blank steadily in position. Lengthwise of the frame a traveling platform, B, is provided, and upon its lower side are cogs or teeth $b^3$, and below the teeth is mounted, on its shaft $b'$, journaled in the frame, the pinion $b^2$, by means of which the platform is driven back and forth, and on the same shaft, $b'$, is mounted gear-wheel K, which meshes with pinion L, which itself is mounted upon shaft $b$, which last-named shaft extends through the frame, and on the opposite side of the machine to pinion L is mounted, upon shaft $b$, the ratchet-wheel T, operated by the pawl Y, attached to the slotted lever Z, which lever at its lower end is fastened to shaft $b$. On each side of the slot Z' in the lever Z are ways, in which reciprocates the bearing-piece $c$, which passes through the slot Z', and is provided with a bearing for the connecting-rod $a$, the latter being confined in place by nut $c^2$. The upper end of rod $a$ is provided with a circular yoke for the cam-wheel $i$, which is fastened upon the main shaft $h$, the result of which construction and arrangement of parts is, that by every revolution of the shaft $h$ the cam-wheel $i$, through connecting-rod $a$ and other connecting parts, revolves shaft $b$ a little way and imparts a feed motion to platform B, which bears the file-blank, and this motion is necessarily in correspondence with the blows of the hammer-head and chisel-arm. The sliding bearing-piece $c$ for the connecting-rod $a$ is adapted to move freely in the ways for it in the lever Z to and from the shaft $b$, but to be also confined to any adjustment desired by means of pin $d$ through any of the series of holes $d'$ into the bearing, as shown in Fig. 10. Of course, the nearer the bearing may be to the outer end of the lever the greater the feed motion will be.

Upon the platform B is made a recess of a semi-cylindrical form, as shown in Fig. 15, and a file-blank support, C, the lower exterior of which is in corresponding form, while the central portion from end to end is hollowed out for the file-blank bed $n$, and provided with two side grooves, $n'$, into which the side flanges, C', of the file-blank bed are inserted, and thus confined. These beds are designed to be removable, and a sufficient number of them, of different forms, to correspond with the different forms of blanks to be cut, kept on hand. $C^2$, in Fig. 14, indicates one for a three-cornered-file blank. The support C is rendered adjustable sidewise in its recess, and may be fastened at any adjustment by inserting the pins $C^3$ into any of the holes $C^4$ in the sides of the platform. It may be operated sidewise by the crank-shaft $C^6$, as shown in Fig. 4. These pins are held in the holes by means of the springs $n^2$.

In Figs. 17, 18, and 19 are shown end views of file-blank beds for blanks of different forms. The pins $C^3$ are provided with flanges on opposite sides of it, and the holes for the pins are provided with four corresponding recesses for the flanges, but two only extend through the bearings, and after the pins are inserted they are locked in position by merely turning them one-quarter of a circle.

In Fig. 13 is shown a device, consisting of a frame, m, confined upon support C by screw $m^3$, and within it a sliding frame $m^2$, having two spiral springs, the function of which is to push the plate $m'$ against the front end of the file-blank and hold it against its rear bearing with a yielding force during the operation of cutting.

For the purpose of shifting the power-band from the fast pulley o onto the loose pulley $o'$, I have invented the device shown in Figs. 12 and 12½. It consists of the post U, the upper end of which is provided with an arm, U', having loop $U^2$ for the band. The lower end of the post turns in its bearing X on the frame, and has fixed upon it handle-lever V and spring-plate e, which plate is provided with catch $e'$, and stud f in the frame is provided with a corresponding catch to engage with it. The spiral spring W is attached at one end to the lower bearing, X, and at the other to lever V, and its force is exerted to twist the post. Now, when the band is on the loose-pulley the apparatus occupies the position shown in Fig. 12. The beveled block g is attached to the traveling platform B, as shown in Fig. 12½, so that it may be adjusted at points along the length of the platform B, and it is adjusted and fastened according to the length of the file-blank to be cut, so that when the blank shall have passed under the cutter from the first to the last end the beveled block g will have passed under the outer end of spring-plate e, raised it, and released its catch from the stud f, then the force of the spring W will twist the post U, which by its arm U' will shift the band from the fast to the loose pulley, and then the machine will stop. Before beginning another operation the post U must be again twisted to compress the spring W, and the catch of the spring-bar e be made to engage with the catch on the stud f, and the handle V is designed to be used for that purpose. The lever R is pivoted to a vertical rod, S, which is provided with a hook upon its lower end, and which takes hold of frame E, so that by raising the lever R that frame may be raised up from the file-blank or lowered, as required. Lest the cam-wheel i should through the connecting-rod a at any time throw the ratchet-wheel too far at a stroke, I have devised a friction brake, consisting of two curved spring-plates, $y'$, having the form shown in Fig. 3, embracing the thickness of the ratchet-wheel between them, and drawn together against it by means of the thumb-screw $y^2$ and its nut.

By reason of the hereinbefore-specified construction and arrangement of parts the operation of my improved machine will be as follows: The file-blank and its bed being at rest, the hammer first rises up, next the chisel or cutter rises up, and then the blank moves, then the chisel comes down, and next the hammer comes down upon the chisel-holder with its blow.

What I claim, and desire to secure as my invention, is—

1. The combination, with the main supporting-frame, of lever F F', notched as described, shaft N', rod I, spring J, lever O, and shaft h, provided with cam q, substantially as and for the purpose described.

2. The combination, with the main supporting-frame, of lever F F', notched as described, weight $F^2$, shaft N', rod I, spring J, lever O, and shaft h, provided with cam q, substantially as and for the purpose described.

3. The combination of the lever O, pivoted at $I^3$, the rod I, pivoted to lever F F', and provided with spring J, nut J', screw-shaft Q, and nut P, substantially as and for the purpose described.

4. The combination of the shaft h, provided with gear-wheel G, shaft $s'$, provided with gear-wheel H, and cam-wheel $s^2$, adapted to convey the revolving motion of shaft h and convert it into vertical reciprocating motion in the link s, and with it the chisel-arm, substantially as described.

5. The combination of the shaft $s'$, provided with cam-wheel $s^2$, and the link s, having flange $s^5$, a diagonal slot in its upper end, and slot $s^3$ in its lower end, substantially as and for the purpose described.

6. The described chisel-arm, mounted on shaft u, in two parts, D and D', jointed together by headed bolt $D^6$ in such a manner as to turn a little upon the adjacent parts, to enable part D' to impart a proper inclination of the chisel-holder to the upper side or edge of the file-blank, substantially as described.

7. The combination of the plate $D^2$, fastened to part D', the headless screw $D^7$, the nut $D^8$, and the spiral spring $D^3$, adapted to adjust the tension of the spring and to render the joint of parts D and D' a yielding one, substantially as described.

8. The combination of the chisel-arm D D', provided with headed screw-bolt $s^4$ and the link s, provided with vertical slot $s^3$, and with a diagonal slot for shaft $s'$, and adapted to furnish an adjustable connection between the chisel-arm and shaft $s'$ and impart the motion of the latter to the chisel-arm, substantially as described.

9. As a device for holding the chisel-arm, with the holder and cutter, down steadily to the file-blank, the combination of the pin K', fixed in the chisel-arm, the spiral spring k, seated upon it, and the bar j, substantially as described.

10. The frame E, swinging on the journal-bar v, turning in the main frame, and having the spiral springs M attached to it, as at E', at their upper ends and to the main frame at their lower ends, adapted to hold down with an elastic pressure upon the file-blank a roller or any device like those shown in Figs. 6, 7, 8, or 9, substantially as described.

11. The combination of the bar S, pivoted to lever R at its upper end, and provided with a hook at its lower end, and the frame E, adapted to raise the frame and its pressure-roller $E^3$ up off the blank when required, substantially as described.

12. The devices shown in Figs. 7 and 8, adapted to be screwed into and operated by the frame E, in combination with that frame, adapted to hold down file-blanks in different forms and positions, substantially as described.

13. The combination of the platform B, provided on its lower side with cogs $b^3$, with pinion $b^2$, gear-wheel K on shaft $b'$, pinion L on shaft $b$, and slotted arm Z, having pawl Y and ratchet-wheel T, adapted to convey the feed motion from the lever Z to platform B, substantially as described.

14. The combination of the shaft $h$, provided with cam $q$, adapted to operate the lever F F', with the cam-wheel $i$, connecting-rod $a$, provided with its yoke-bearing $c$, and slotted lever Z, the whole adapted to transmit the feed motion from the shaft $h$ to shaft $b$, substantially as described.

15. The combination of the shaft $b$ with the slotted lever Z, fastened thereon, and having slot $Z'$ and ways for the bearing-piece $c$, and fastened at any desired adjustment on the lever by means of pin $d$ and holes $d'$ at graduated distances from the shaft, substantially as and for the purpose described.

16. The combination of the ratchet-wheel T, fastened upon shaft $b$, with the described friction-brake for the same, consisting of the curved plates $y'$ and thumb-screw $y^2$ and its nut, substantially as and for the purpose described.

17. The combination of the platform B, the upper surface of which is hollowed out, as shown, and the support C, the under surface of which corresponds to the upper surface of the platform, and which support is provided with a series of holes, $C^4$, and grooves $n'$, substantially as and for the purpose described.

18. The combination of the pins $C^3$ and the bearings for them in the platform, and springs $n^2$, adapted to hold the pins in the holes $C^4$ and keep the support C to any lateral adjustment required, substantially as and for the purpose described.

19. The described platform-bed, the upper face of which is adapted to receive the file-blanks of the different forms shown in Figs. 14, 15, 16, 17, 18, and 19, while the lower side edges are adapted in size and form to enter and be held by the grooves $n'$ in the support C, substantially as described.

20. The described band-shifting device, consisting of post U, having bearings X on the frame, spring W, lever V, spring-plate $e$, having catch $e'$, stud $f$, and the arm $U'$, having loop $U^2$, substantially as and for the purpose described.

21. The combination of the hollow arch $r$, having sliding spring-case $r'$, with rubber spring $r^2$, the screw-shaft $r^3$, and the lever F F', substantially as and for the purpose described.

HERMANN F. W. LIEBMANN.

Witnesses:
 JOS. W. BROWN,
 CHAS. COLAHAN.